United States Patent [19]

Benvenuti

[11] Patent Number: 4,998,096
[45] Date of Patent: Mar. 5, 1991

[54] MULTIPURPOSE ALARM DEVICE

[76] Inventor: Anthony Benvenuti, 23400 - 46th Ave. W., Mountlake Terrace, Wash. 98306

[21] Appl. No.: 371,053

[22] Filed: Jun. 26, 1989

[51] Int. Cl.⁵ .............................................. G08B 21/00
[52] U.S. Cl. .................................. 340/605; 200/61.05; 200/61.93; 340/521; 340/545; 340/691
[58] Field of Search .............. 340/605, 691, 521, 545; 200/61.05, 61.93

[56] References Cited

U.S. PATENT DOCUMENTS

| | | | |
|---|---|---|---|
| 2,127,538 | 8/1938 | Seiger | 200/61.05 |
| 2,644,050 | 6/1953 | Seiger | 200/61.05 |
| 2,874,695 | 2/1959 | Vaniman | 128/886 |
| 3,399,399 | 8/1968 | Apfelbaum | 340/691 |
| 3,469,250 | 9/1969 | Voigt | 340/598 |
| 3,696,357 | 10/1972 | Kilgore | 340/573 |
| 3,696,360 | 10/1972 | Gajewski | 340/602 |
| 3,739,365 | 6/1973 | Müller | 340/578 |
| 3,872,419 | 3/1975 | Groves et al. | 338/25 |
| 3,940,753 | 2/1976 | Müller | 340/578 |
| 4,126,857 | 11/1978 | Lancia et al. | 340/605 |
| 4,194,192 | 3/1980 | Albinger, Jr. | 340/517 |
| 4,212,007 | 7/1980 | Reyes et al. | 340/545 |
| 4,258,359 | 3/1981 | McLamb | 340/546 |
| 4,297,686 | 10/1981 | Tom | 200/61.05 |
| 4,319,232 | 3/1982 | Westphal et al. | 340/605 |
| 4,325,060 | 4/1982 | Purtell et al. | 340/605 |
| 4,379,290 | 4/1983 | Muggli et al. | 340/629 |
| 4,640,628 | 2/1987 | Seki et al. | 374/141 |

Primary Examiner—Glen R. Swann, III
Attorney, Agent, or Firm—Patrick Michael Dwyer

[57] ABSTRACT

A hot water tank leakage detection system having a conventional smoke alarm unit 10, conductor pair 20, and probe 30. Conductor pair 20 is removably connectable to alarm unit 10 through male/female two conductor jack pair 15 and 25 respectively. In use probe 30 is placed in the predicted water shed of hot water tank 40.

9 Claims, 1 Drawing Sheet

MULTIPURPOSE ALARM DEVICE

TECHNICAL FIELD

The invention relates to the field of alarm devices and particularly to multipurpose alarm devices. More particularly, the invention relates to improvements to existing alarm systems to effect an alarm upon the occurrence of more than one condition.

BACKGROUND OF THE INVENTION

Ceiling mounted smoke alarm systems have become common in residences throughout the United States of America, and indeed are required by many fire and safety codes. Such conventional smoke alarms serve to detect the presence near the ceiling of suspended particulate matter in the breathable air of such a household in relatively small concentrations. In fact they will detect in the home atmosphere more than actual "smoke"; as concentrations of dust and water vapor will also activate their alarms, due to their sophisticated ionization chamber detection techniques.

Equally ubiquitous throughout these same households is the conventional hot water heater usually consisting of a storage/heating tank, heating coils if electric, or burner section if gas or oil fired, and associated plumbing and/or wiring. Unfortunately the hot water tanks, as they grow old, or if they are otherwise damaged, may develop leaks which go either unnoticed or undetected, due in part to the remote and sometimes concealed installation location of the water heater. Leaks not detected very soon after they begin can cause severe water damage to the areas of the household surrounding and beneath the water heater. It is therefore of primary importance to have an apparatus and method for early detection of hot water tank leaks.

Since the probability of leakage for any one tank is of a low order, it is difficult to justify the expense of a single purpose specially prepared and installed hot water tank alarm system. On the other hand, putting the ubiquitous smoke alarm to use involves only small expense and effort.

Heretofore no such apparatus or method has been proposed, and certainly no such apparatus or system has been proposed which makes use of an already existing alarm system elsewhere in the household. Accordingly it is an object of the invention to provide a method and apparatus for early detection of hot water tank leaks.

It is a further object of the invention to provide an apparatus and method of providing for the early detection of hot water tank leaks by modifying and making use of a conventional smoke alarm system in the same household.

Other needs arise in a typical household where warning by an alarm system would be beneficial, but where, perhaps, the cost of purchasing and installing such an alarm system would also be prohibitive. For instance window, door, and other access ways to the household, if they are alarmed at all are usually separately alarmed. Similarly, if sump pumps are monitored for failure, the alarm system is a separate one. Accordingly it is an object of the invention to provide a means of protecting access ways to a household, and meeting other alarm needs, by modifying and using a conventional smoke alarm system in the household.

DISCLOSURE OF THE INVENTION

These and other objects of the invention which will become apparent are met by the apparatus and methods disclosed herein. The invention comprises apparatus and methods for providing an early warning alarm for the detection of leaks from a hot water storage/heating tank, by modifying and using a smoke alarm unit in the same household in which the hot water tank is located.

The apparatus comprises a conventional smoke alarm unit wherever it might be mounted, although they are typically ceiling mounted, a pair of conductors which are connected to the interior of the smoke alarm system, and, at the opposite end of the pair of conductors, a sensor probe.

The pair of conductors are connected to the interior of the smoke alarm unit in such a way that, when the sensor probe end of the circuit is closed, the ionization chamber is bypassed and the alarm sounding circuit is completed to sound the alarm. It is contemplated that many different connection methods are possible for attaching the two conductors to the interior of the conventional alarm unit, such as opening the alarm unit case and directly soldering the two conductors at the appropriate points inside the unit, which locations would be well known to those skilled in the art, and then closing the case. Alternatively, a kit may be provided with instructions and a pair of leads having alligator clips or magnetic terminals for attachment to the alarm unit's interior. However in preferred embodiments, the conductors terminate at their alarm unit end in a conventional two conductor jack, preferably a male mini phone jack, which would connect and electrically communicate through an appropriate female counterpart which itself is wired directly to the appropriate interior points in the alarm unit. The female mini phone jack would be located somewhere on the periphery of the conventional alarm unit. Thus the conductors may simply be plugged into the alarm unit by connecting the male phone jack to the female jack on the alarm unit. This provides for connection at will, and also provides for standardization of manufacture of the units so that conductors of varying lengths may be plugged into the unit as best fits the needs of the household and so that when an alarm unit needs to be replaced the rest of the alarm system of the invention does not need to be replaced with it.

It is contemplated that the sensor probe of the invention can be met in many different structures, either bipolar or multipolar, provided that the two conductors electrically communicate with two or more electrically conductive poles of the probe and that at least two of the electrically conductive poles of the probe corresponding to different conductors are relatively close together and electrically insulated from one another. In preferred embodiments standard two conductor male phone jacks, preferably mini phone jacks, are employed as bipolar sensor probes.

The apparatus of the invention is employed by modifying a conventional alarm unit as described above, by running the pair of conductors from the alarm unit wherever it is located to a position generally below and beneath the water heater tank to be monitored, and by placing the sensor probe upon a surface which lies generally in the probable water shed path of leakage from that tank. The apparatus will function simply in that any water which leaks from the tank and touches the probe will form a conductive electrical communication path between two or more of the electrically communicating portions of the probe, thereby completing a circuit to which the alarm section itself in the conventional smoke alarm unit is highly sensitive. For instance test of a prototype apparatus has indicated that the normal latent moisture on the skin of a human being between thumb and forefinger is enough to provide a completion of circuit when the end of the probe is grasped and while the conventional alarm unit is powered on.

The method of the invention may be accomplished by connecting, as described above, or in other ways which will occur to those skilled in the art, at least two conductors to the alarm sounding portion of any available alarm unit, terminating the two conductors at their ends opposite the alarm unit in a sensor probe which is at least bipolar, and placing the probe beneath the hot water tank.

It is contemplated that preferred embodiments of the alarm system of the invention will make use of a ceiling mounted conventional smoke alarm, however it is not necessary that the smoke alarm be mounted on the ceiling in order to work as a hot water leakage alarm, and other embodiments of the invention specially employing a conventional smoke alarm unit mounted relatively more proximally to the water heater itself may be employed without departing from the scope of the invention. It is also contemplated that conventional alarm units which either do not serve, or do not primarily serve, as a smoke alarm unit may also be employed to the same purpose in the invention. All that is required is an alarm sounding circuit which can be triggered by a low current level signal. However it is believed that the greatest benefit from the invention arises in the use of the already ubiquitous and relatively inexpensive smoke alarms in residential households. The cost factor is important in terms of the benefit of the invention in that water heaters fail with such a low frequency that most hot water heater owners would likely not invest in a separate alarm system whatever its cost against the possibility or eventuality of hot water tank leakage sometime in the distantly contemplated future. However a system which involves inexpensive modification, or which if properly exploited can be incorporated into existing alarm systems either as an alarm system with conductors protruding or more likely as an alarm system with the female mini phone jack described above already installed at the factory, the cost of making use of that system for hot water tank leakage detection would be nominal and therefore appeal to a broad base of tank owners.

Where conventional smoke alarm units are modified either at home or at the time of manufacture at the factory with a female jack as described above the alarm unit can then serve to fulfill a number of different alarm purposes separately, serially, or simultaneously. For instance a window entry alarm, comprising at least one pair of electrical conductors positioned in such a way as would be well known in the art that when the window is opened to a predetermined extent the electrical conductors touch or become close enough so that an electrical charge may pass thereacross, may have its own pair of conductors terminating in a male mini phone jack connectable to the modified ceiling mounted smoke alarm. The window access alarm system can be connected or disconnected from the alarm unit at will and substituted for the hot water probe and conductor, thus providing a simple switching system between different alarm detection means, each means having its own terminal electrical conductors or probes and its own pair of conductors.

Alternatively the pair of conductors from each alarm sensing position can be wired together either by splicing, by bus, or by other conventional electrical connecting means, so that all alarm sensing positions are always "active." Of course this system would have the disadvantage that a sounding alarm would be ambiguous as to what condition was being detected. But where the number of alarm sensing positions, including the smoke alarm sensing position, are relatively few, it should not present a problem in the ordinary household. As another alternative, the various alarm sensing positions, except for the smoke alarm position itself, can be electrically communicating with the terminals of a rotary switch of a type well known in the art such that various alarm sensing positions could be selectably "dialed". This rotary switch, if visible, will provide an unambiguous identifier as to which alarm circuit is active. If not conveniently visible, some conventional remote display may be employed to display, as by colored lights, the position of the dial to indicate the active circuit. In another contemplated embodiment, the variously "dialable" positions could be sequentially called up by some sort of conventional electromechanical rotary timing and switching device to step through the various alarm positions so that a different position is "active" for a period of time which can be predetermined for each position.

BEST MODE FOR CARRYING OUT THE INVENTION

Figure 1:
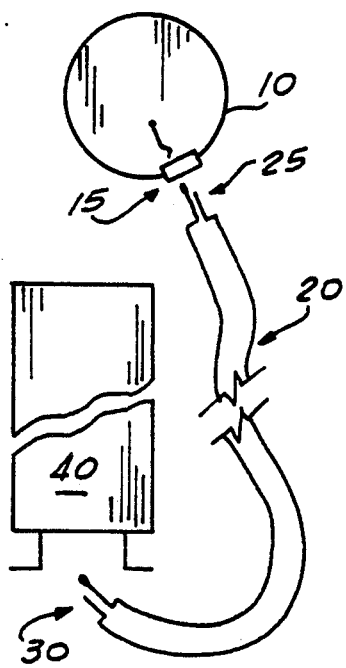
FIG. 1 is a schematic illustration of one embodiment of the invention.

Referring now to the drawings wherein like numbers indicate like parts embodiments are illustrated in FIGS. 1-5 which comprise the inventor's contemplated best mode of carrying out the invention.

In FIG. 1, the alarm sounding portion of a conventional alarm device 10, preferably a conventional battery operated smoke alarm, which will be typically ceiling mounted in a residential household, is disconnectably attached to a conductor pair 20 by means of female jack 15 and male plug 25, schematically illustrated. In practice, a smoke alarm called "Lifesaver" made by Fyrnetics, Inc., of Elgin, Ill., model no. 0905, has proven satisfactory. Female jack 15 may be installed upon conventional alarm device 10 either by the residential user or by the manufacturer of the alarm unit at time of manufacture, or by any other intermediary persons between manufacturer and residential user. As a result of the impact of this invention it is contemplated that all conventional smoke alarms will be equipped in the future with a connector of some kind for the detachable connection of a conductor pair 20 for the practice of the invention. Conductor pair 20 may be of any length suitable to connect to the alarm device 10 wherever it is mounted or located in the residential unit and to the sensor probe 30. The length of conductor pair 20 may be as little as several feet if the alarm device is mounted upon or near water heater tank 40 or may be quite long if a ceiling mounted alarm device 10 on the second floor is intended to be connected with a probe 30 beneath a water tank 40 located in the basement. While it is contemplated that the principle uses of the invention will occur in residential households, it is contemplated also that commercial, multi-family, and industrial uses will also be made of the invention without departing from the scope of the invention, and remarks directed toward residential units are not intended to limit the potential scope of usage of the invention.

Probe 30 is typically placed below and generally beneath water heater tank 40 for the detection of water leakage from tank 40. However, probe 30 will function as intended as long as it is placed anywhere in the likely path which leaking water would take upon reaching the surface beneath tank 40 which supports the tank, typically the basement or utility room. This path is herein referred to as the watershed path.

Female jack 15, which in a preferred embodiment is a female two conductor mini phone jack, is directly wired to the alarm sounding circuit of alarm device 10 in a manner well known to those skilled in the art, such that electrically bridging the poles of female jack 15 will result in sounding of the alarm. Thus connection of male jack 25 to female jack 15, wherein male jack 25 in a preferred embodiment is a two conductor male mini phone plug, extends the open circuit to probe 30 beneath the water heater tank 40. Conductor pair 20 may be twisted or straight, shielded or not, and may be comprised of any wire diameter suitable for the distances over which the connection must cover at the voltage levels of the alarm 10. The conductor pair should of course be electrically insulated from each other. Thus when the poles of probe 30 are bridged as by the electrical conductivity of water or moisture, the alarm of alarm device 10 will sound.

Figure 4:
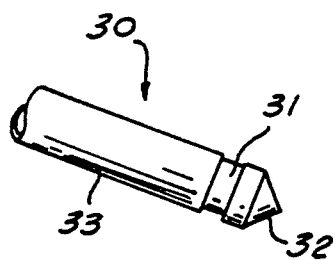
FIG. 4 is a detail of an embodiment of the probe structure schematically illustrated in FIG. 1.

In a preferred embodiment probe 30 is also a two conductor male mini phone plug. However it is contemplated that any well known, or hereafter developed, probe type wherein two separate electrically conducting poles are placed in close proximity to one another will serve effectively as a probe. In its simplest embodiment, a probe could simply be the stripped ends of conductor pair 20 juxtaposed to one another in such a way that accidental contact with each other was rendered unlikely, while at the same time preserving a close enough spacing so that a relatively small amount of water or moisture could electrically bridge the gap between the stripped ends. FIG. 4 illustrates in detail a preferred configuration for the end of probe 30, and although it is roughly illustrative of the end of a conventional male mini phone plug, it is not intended to be exclusive of other possible probe end configurations. What is required is a probe tip 32 separated from a probe shank 33 by an insulator 31 in a well known manner such that even a thin film of water or moisture crossing insulator 31 and bridging tip 32 with shank 33 serves sufficiently to complete the circuit to activate the alarm of alarm device 10.

Figure 2:
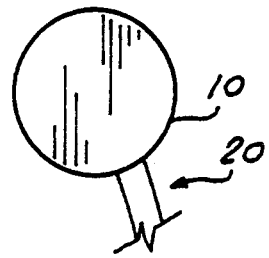
FIG. 2 is a partial schematic of an alternate embodiment of the invention.

In an alternate embodiment shown in FIG. 2, the alarm sounding circuit of alarm device 10 is directly and permanently wired to conductor pair 20 without jacks. Conductor pair 20 passes thence to either probe 30, as in FIG. 1, or to other alarm sensing positions such as are schematically illustrated by example in FIG. 3.

Figure 3:
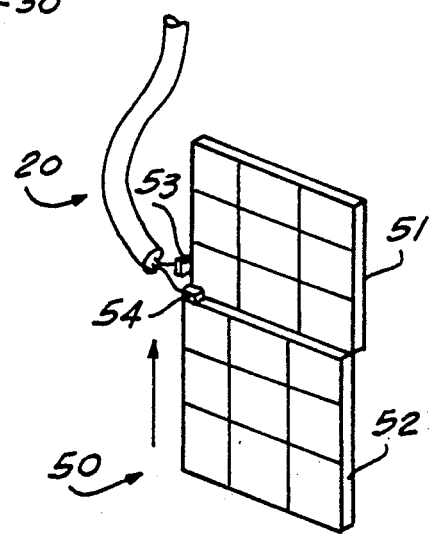
FIG. 3 is a partial schematic of an alternate embodiment of the invention for detecting entry.

In FIG. 3 conductor pair 20 leading from alarm device 10 is connected in a well known manner to a window frame 50 schematically illustrated. Window frame 50 has mounted upon it conducting strips 53 and 54 such that the opening of lower window frame 52 places its conducting strip 54 into contact with conducting strip 53 of upper window frame 51 to complete an electrical circuit and thus sound the alarm of alarm device 10. Conducting strips 53 and 54 may be comprised of foil strips, bare wire, metallic strips or plates, or other materials well known in the security and entry alarm arts. In this embodiment strips 53 and 54 comprise the equivalent of sensor probe 30 in other embodiments.

Figure 5:
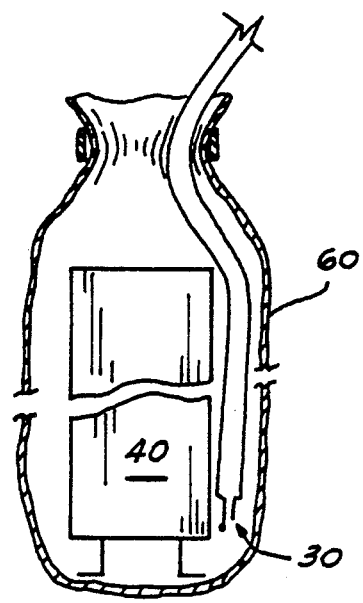
FIG. 5 is a partial schematic of an alternate embodiment of the invention.

In yet an another alternative embodiment shown in FIG. 5, water heater tank 40 is enclosed is an insulating bag 60 (schematically illustrated), which is preferably moisture proof and/or water tight, and probe 30 is placed within bag 60 but outside of tank 40, and preferably near the inside bottom of bag 60. In this manner probe 30 serves to detect water heating leakage even in those embodiments where a water tight bag has been placed around the heater to prevent the spread of such leakage, or where energy conservation dictates insulating the hot water tank.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

INDUSTRIAL APPLICABILITY

The invention is applicable to both the home safety/alarm system industry and the plumbing/hot water tank industries. The invention provides an extremely cost effective means of detecting eventual hot water tank leakage over the span of many years with practically no cost beyond the cost of the existing alarm system. Installation, particularly with ceiling mounted smoke alarm units that have been appropriately modified to contain a conventional female two conductor jack, could be accomplished by homeowners through the purchase of after market kits sold for the water heater leak detection purpose and for other detection purposes as well. Use of the invention broadens the purpose and usefulness of conventional alarm units while at the same time providing for a much needed cost effective means to make early detection of water tank leakage possible.

I claim:

1. In a conventional alarm unit, the improvement comprising:
   a pair of conductors electrically communicating with the input terminals of the alarm sounding circuit of said alarm unit; and, at the other end of said pair of conductors,
   a bipolar sensor probe comprised of a conventional two-conductor male mini phone plug, each pole thereof electrically communicating with one of said pair of conductors.

2. The apparatus of claim 1 wherein said conventional alarm unit is a conventional smoke alarm unit.

3. The apparatus of claim 1 wherein said pair of conductors communicates with said input terminals through a male/female plug/jack pair.

4. The apparatus of claim 3 wherein said plug/jack pair comprises a female two-conductor mini phone jack electrically connected to said input terminals, and a male two-conductor mini phone plug at an end of said pair of conductors opposite said probe.

5. A method of detecting leaks form a hot water tank comprising the steps of:
 (a) connecting at least two conductors to the alarm sounding portion of a conventional alarm unit, which two conductors terminate at their ends opposite the alarm unit in a bipolar sensor probe, such that the opposite poles of said probe are in close proximity to, but insulated from, each other;
 (b) placing said sensor probe beneath said water tank;
 (c) wrapping said probe and said water tank in a moisture-containing wrap such that said probe is located in a lower portion of said wrap.

6. The method of claim 5 wherein said probe is placed on the water tank's support surface within the water shed of said tank.

7. An apparatus for detecting a number of different alarm conditions comprising in combination:
 (a) a conventional alarm unit, said alarm unit equipped with a two-conductor female mini phone jack electrically connected to the input terminals of the alarm sounding circuit of said alarm unit;
 (b) a two-conductor male mini phone plug having two poles capable of being bridged to close an otherwise open electrical circuit during the occurrence of one of said conditions; and
 (c) a pair of conductors electrically communicating with said two poles of said sensor probe and with a second male mini phone plug connectable to said female mini phone jack.

8. The apparatus of claim 7 wherein said alarm unit is comprised of a conventional ceiling mounted smoke alarm.

9. The apparatus of claim 7 wherein said poles are electrically opposite and whereby said alarm sounding circuit is activated whenever said two opposite poles are bridged.

* * * * *